Dec. 6, 1966     G. P. ARTAUD     3,289,273
CUTTING TOOL ASSEMBLY
Filed April 1, 1964
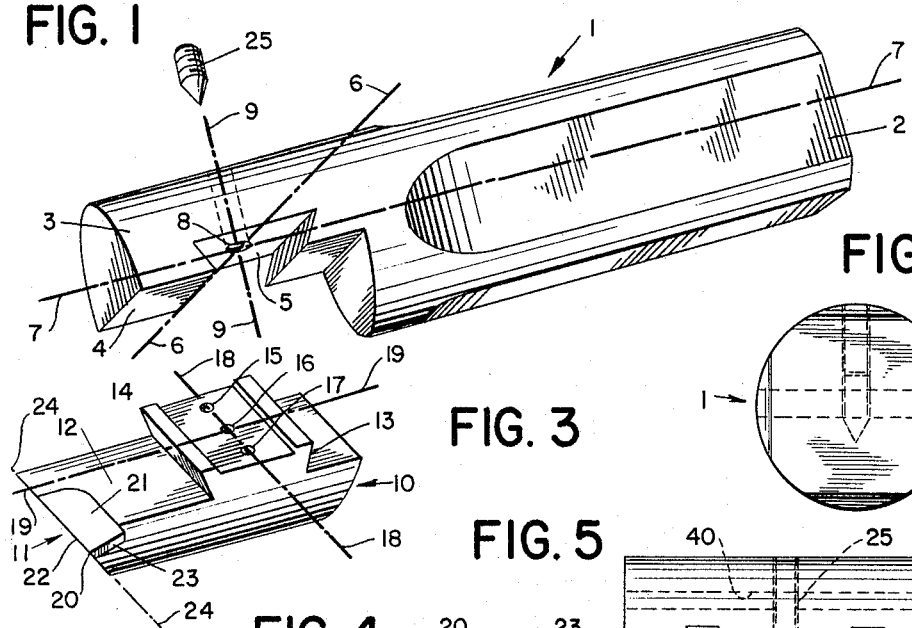
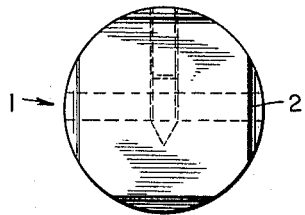
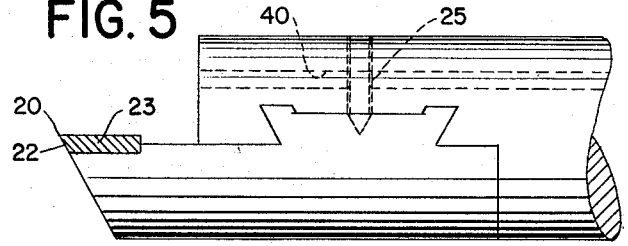
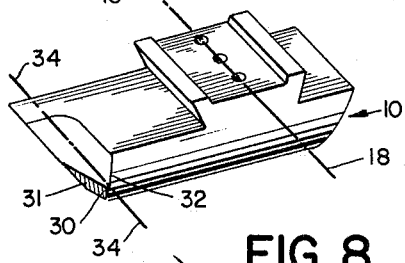
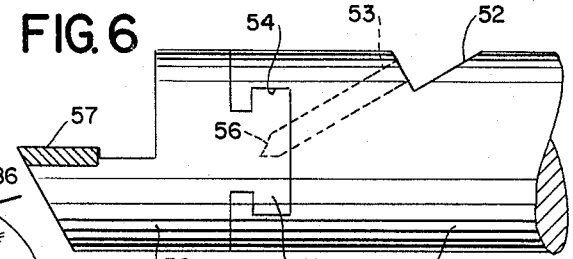
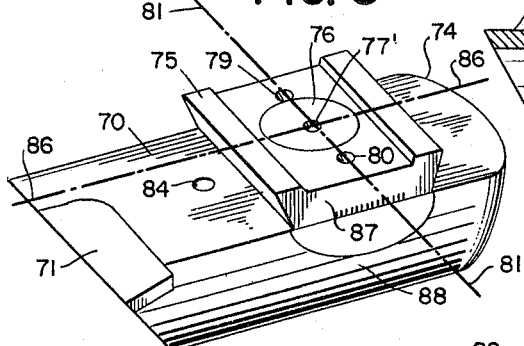
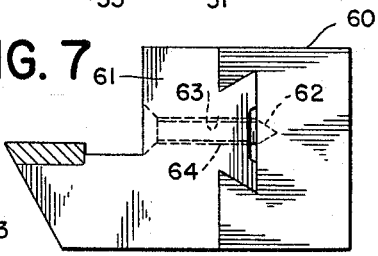
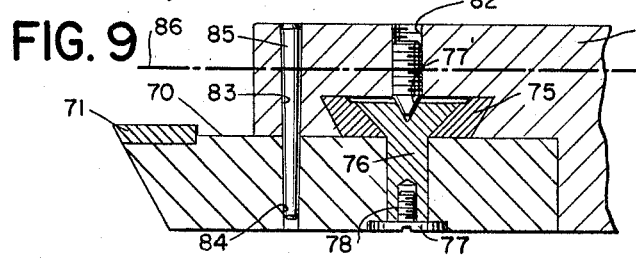
INVENTOR.
GERARD P. ARTAUD
ATTORNEYS

United States Patent Office 3,289,273
Patented Dec. 6, 1966

3,289,273
CUTTING TOOL ASSEMBLY
Gerard P. Artaud, 93 1st St., Harrison, N.Y.
Filed Apr. 1, 1964, Ser. No. 356,607
8 Claims. (Cl. 29—96)

This invention relates to a cutting tool assembly and more particularly to a tool retainer and self centering, removable tool head that may be removed and remounted in the retainer or replaced with another tool head without changing the original orientation of the tool's cutting surface relative to a fixed reference line on the retainer.

In conventional metalworking machines, such as milling machines, boring machines, threading machines and the like, the cutting implement employed for performing the metalworking operation invariably becomes dulled, chipped or broken during continued use and thus requires either resharpening or replacement before the cutting operation can be continued. Resharpening or replacement of the cutting tool, in turn, requires that the tool be backed away from the workpiece, removed from the metalworking machine, and after the resharpening operation, placed back in the machine in such a manner that the cutting surface of the tool is precisely oriented in the same position relative to the workpiece as it was originally so as to continue the cutting at the proper point on the workpiece and at the proper cutting angle. In remounting the new or reconditioned tool in the metalworking machine, its cutting surface must be reoriented along four different reference lines. Assuming, for example, that the workpiece is positioned in a vertical plane and the path of movement of the cutting tool toward the workpiece is in a horizontal plane, the cutting point or surface of the new tool must be oriented rotatively about the longitudinal axis of the path of approach of the tool, longitudinally along the longitudinal axis of the path of approach, and in the plane of the workpiece in both a horizontal and vertical direction. When this four way orientation has been effected, the cutting operation may be restarted with the assurance that the new cutting surface is in precisely the same position with respect to the workpiece as the previous cutting surface and will therefore produce an accurate continuation of the original cutting operation.

This removal, resharpening or replacement, and reorientation of the new cutting tool as described above, however, results in a period of downtime for the metalworking machine and is an important factor that must be considered in determining the total manufacturing cost of the finished workpiece. With presently constructed cutting tool assemblies, the time required for reorienting the new tool frequently accounts for a major portion of the machine downtime.

Generally, there are two types of cutting tool assemblies presently employed in metalworking machines. One of these consists of an integrally formed shank member having a cutting edge formed at one end and adapted to be secured at its other end into the tool holder of the cutting machine which may be either a tool post or tool chuck, and the other consists of a tool shank or retainer and separately formed cutting member secured to the working end of the shank. In the first construction the tool is placed directly into the tool post or chuck and the entire tool is removed from the holder each time replacement or resharpening of the cutting edge is required. Due to the fact that the entire tool assembly must be removed each time resharpening or replacement is required, the original tool orientation is completely destroyed and, since subsequent insertion of the new tool into the tool post or chuck will not inherently place the tool shank in its original position, the subsequent orientation of the new tool must be started from the beginning with individual aligning steps required for effecting reorientation with respect to each of the four reference lines.

In the other type of tool arrangement presently employed, the tool element itself is formed separately from the tool retainer or shank and is removably secured to the shank by suitable clamps. Although with this construction the shank need not be removed from the metalworking machine in order to resharpen or replace the cutting tool, the tool element must nevertheless be removed and upon subsequent replacement, must be oriented with the same preciseness as required in the first construction before the cutting operation may be restarted. In neither of the conventional tool assembly constructions as presently used, however, is there provided any means for automatically reorienting the cutting tool as it is remounted in the metalworking machine, and accordingly the four way aligning procedure as described above must be carried out as separate steps before the cutting operation may be restarted.

Another factor that must be considered in determining the total manufacturing cost of a finished workpiece is the relationship between the rate at which the cutting operation is effected and the number of downtime periods that are required during a complete metalworking operation. In performing a particular cutting operation, the speed at which the cutting is effected will determine the rate at which the cutting surface is dulled. This relationship between the cutting speed and rate of dulling of the cutting surface or point is not, however a direct relationship. Increasing the cutting speed of the machine by doubling the rate at which the cut is made, for example, will more than double the rate at which the blade is dulled. In actual practice, therefore, these two factors, cutting rate and dulling rate, are both considered and correlated to find the combination that gives the shortest number of downtimes for the complete manufacturing operation.

Certain types of machine tools, such as automatic turret lathes which are programmed to perform automatically successive operations on a workpiece, and the Swiss-type cam-controlled automatic screw machines afford reduced manufacturing cost and increased uniformity of machine tooled pieces. These automatic machines include a plurality of cutting tool holders that are successively and automatically indexed into cutting position at the proper time to perform specific cutting operations. In originally setting these machines in operating position, it is necessary to set each of the different cutting tools in each of the holders so that each tool, when indexed into cutting position against the workpiece, will be in precisely the same position as each of the other tools. Assuming that this original setting of all the tools has been accomplished and one of the tools brought into cutting position against the workpiece, it is apparent that when this particular tool becomes dulled and requires resharpening or replacement, removal from its tool holder will destroy not only its orientation with respect to the workpiece but also its orientation with respect to the other tools. Accordingly, with presently constructed tool assemblies, remounting of the tool in its tool holder will require reorientation of all of the tools until each is again set to be in precisely the same position relative to the workpiece when indexed into cutting position.

The present invention makes possible a further reduction of the manufacturing cost by reducing the time required to properly orient the cutting edge of the tools after they have been resharpened or replaced. Orientation problems are essentially eliminated and a cutting tool when dulled may be removed, resurfaced and replaced into the metalworking machine in precisely the same position as before in minimum time and with minimum adjustment.

Tools constructed in accordance with the present invention are also very useful in machine tools which have only a single tool post or chuck because placement and orientation of different cutting tools may be made so accurately and quickly.

Generally, a tool assembly according to the present invention comprises a tool retainer which is adapted to be secured at one end into the tool post or chuck of the metalworking machine and is provided at its front or working end with a removable tool head. In distinction to conventional two part tool constructions, however, the tool head of the present invention has a cutting element brazed or otherwise fixed onto the tool head and the tool head itself is provided with means cooperating with the tool retainer whereby the tool head will be surely oriented in precisely the same position with respect to the tool retainer each time the head is removed and subsequently remounted. To provide this orientation, the tool head of the present invention is provided with a slide member and the tool retainer is provided with a complementary groove for assembling the head to the retainer. In addition to this, one of the members is provided with at least one set screw having a tapered point and the other member is provided with complementary tapered recesses for receiving the tapered point of one or more set screws to lock the parts together once the slide and groove assembly has been affected. Further, in the preferred construction of the present invention, a cutting tool having a cutting point is so positioned on the tool head whereby it will remain in a fixed orientation with respect to a predetermined reference line on the tool assembly through repeated resharpening operations.

As will be more fully described below, downtime of the metalworking machinne necessitated by reorienting the cutting surface of the tool each time it is resharpened or replaced is thereby reduced to a minimum, and the cutting surface of the tool will, in accordance with the teaching of the present invention, remain in a fixed orientation both about and along the longitudinal axis of the tool retainer thus requiring only a minimum amount of adjustment of the tool before the same or a different cutting operation may be recommended.

Referring to the accompanying drawings:

FIG. 1 is a perspective view of one embodiment of the tool retainer of the present invention;

FIG. 2 is a cross-sectional view of the tool retainer shown in FIG. 1;

FIG. 3 is a perspective view of a tool head constructed in accordance with the teachings of the present invention;

FIG. 4 is a perspective view of a tool head similar to that of FIG. 3 with a modified cutting element mounted thereon;

FIG. 5 is a cross-sectional view of the assembled tool retainer and head of FIGS. 1 and 3;

FIG. 6 is a cross-sectional view of a modified embodiment of the tool assembly of the present invention;

FIG. 7 is a cross-sectional view of still another modified embodiment of the tool assembly of the present invention;

FIG. 8 is a perspective view of still another embodiment of the tool head of the present invention; and FIG. 9 is a cross-sectional view of the head of FIG. 8 secured to a tool retainer.

As shown in FIG. 1 of the drawings, the tool retainer 1 of the present invention comprises an elongated rod member having a shank portion 2 and a front portion 3. The cross-sectional shape of the retainer in the preferred construction is generally square as shown in FIG. 2 with the corners rounded to define segments of a single circle. In this manner, the tool retainer is advantageously adapted for mounting in either a tool post or chuck as desired.

The front portion of the tool retainer is cut away as shown in FIG. 1 to define a seating portion or seat 4 and this seat is provided with a dovetailed groove 5. As shown in FIG. 1, the longitudinal axis or centerline 6—6 of the groove extends transversely of the longitudinal axis or centerline 7—7 of the retainer for purposes more fully explained below. An aligning orifice 8 extends through the front portion of the tool retainer and is formed along an axis 9—9 extending perpendicular to both the longitudinal axis of the retainer and the longitudinal axis of the dovetailed groove. Although only one aligning orifice is shown, it is to be understood that additional orifices may be provided along the axis 6—6 where large tool heads are to be used and where heavy workloads make it necessary.

A tool head constructed in accordance with the teachings of the present invention is shown in FIG. 3 and comprises a body portion 10 having a cutting element 11 fixed thereto at one end. In the preferred construction, the cutting element is made of solid carbide and brazed onto the head. The upper surface of the tool head defines a seating surface 12 and is provided with a raised dovetailed slide 13. The slide is undercut as shown at 14 and provided with three conically tapered recesses 15, 16, 17. The longitudinal center axis 18—18 of the slide 13 is coincident with a line drawn through the center of each of the recesses 15, 16 and 17 and extends along a direction perpendicular to the longitudinal center axis 19—19 of the head. This construction whereby a plurality of recesses are provided permits various sized tool heads to be interchangeably mounted within a single tool retainer and permits variations of the operating range of any particular cutting tool. It will also be noted from FIG. 3 that the cutting point 20 of the cutting element 11 is defined by the intersection of the surfaces 21, 22 and 23. The surfaces 21 and 22, in turn intercept along a line 24—24 which extends parallel to the center axis 18—18 of the slide member. Sharpening of the cutting element is effected along the face 23 whereby the cutting point 20 will always remain at the same distance from the center axis 18—18.

In mounting the tool head of FIG. 3 onto the tool retainer of FIG. 1, the slide member 13 is slid into the groove 5 until one of the tapered recesses 15–17 is approximately aligned with the orifice 8. The slide 13, groove 5, and seat portions 4 and 12 are accurately machined so that this positioning will automatically orient the head 10 in a direction along and in a direction rotatively about the longtiudinal axis 7—7 of the tool retainer, and since the cutting element is fixed to the head with the cutting point 20 at a fixed distance from the center axis 18—18, this positioning of the tool head will likewise automatically orient the cutting surface 20 both about and along the lonigtudinal axis 7—7 of the tool retainer. In order to orient the tool head along the axis 6—6, a tapered set screw 25 shown in FIG. 5 is threaded through the orifice 8 and into the appropriate recess 15–17. Since the angle of taper on the set screw is the same as that of the recesses, the head will automatically complete its orientation along the axis 6—6 as the screw is tightened.

In operation of a typical metal working machine employing the tool assembly shown in FIGS. 1–3, the cutting point 20 will at the start of the cutting operation be aligned with the workpiece through suitable controls on the metal-working machine. Assuming that the workpiece is disposed in a vertical plane and the path of movement of the tool toward the workpiece is along a horizontal line extending perpendicular to the plane of the workpiece, the original orientation will include alignment of the entire tool by movement of the tool post or chuck toward the workpiece, and alignment in both a vertical and horizontal direction along the plane of the workpiece. Once this orientation has been effected, the cutting operation is begun and continued until resharpening or replacement of the cutting element is desired. When the cutting point 20 has become dulled and it is desired to resharpen the cutting element, the tool is backed away from the workpiece through a predetermined distance such as two inches, the head 10 is removed, the cutting element 11 ground along the face 23 and the head replaced into the tool retainer 1. As indicated above, the positioning of the tool head in the tool retainer will automatically orient the head in the same position that it occupied before removal and since the resurfacing operation is done on the surface 23, the cutting point 20 will also be oriented in all directions except in the direction along the axis 24—24. The amount of material ground off the surface 23 of the cutting element may, however, be regulated so that the distance the point 20 will move along the axis 24—24 during grinding of the surface 23 may be accurately controlled. More specifically, the axis 19—19, for example, may be used as a reference line and with the original distance between this line and the point 20 as measured along the line 24—24 being known, it is a simple matter to calculate the new distance between the line 19—19 and the point 20 after the surface 23 has been reground. Accordingly, in order to orient the cutting point 20 in precisely the same position with respect to the workpiece as it originally had, only two predetermined adjustments of the tool post or chuck need be made. First the tool post or chuck is moved toward the workpiece through the original two inch backoff distance and then adjusted transversely of the workpiece along a direction parallel to the axis 24—24 by a predetermined distance equal to the distance the point 20 has been displaced along the line 24—24 due to wear and resurfacing.

It can thus be seen that with the tool assembly of the present invention reorientation of the cutting tool with respect to the workpiece requires only a minimum amount of downtime, and that since the downtime is reduced over that usually required for conventional tool assembly constructions, the cutting speed may be increased and the overall production costs at the same time decreased.

In FIG. 4, a modified cutting element is shown as mounted on the tool head 10. In this construction, the cutting point 30 is defined by the intersection of the surfaces 31 and 32 with the top surface 33 of the cutting element. Resharpening of the cutting element is effected by grinding along the surfaces 31 and 32 without disturbing the angle of intersction of these surfaces and accordingly the point 30 will remain disposed along the line 34—34 extending parallel to the axis 18—18 of the slide member in the same manner as the cutting point 20 of the arrangement shown in FIGS. 1–3.

As described above, FIG. 5 shows the tool head and retainer of FIGS. 1–3 assembled for insertion into the metal-working machine, and as further shown in dotted lines in FIG. 5, the tool head and retainer may be provided with a center hole 40 for supplying coolant to the cutting tool if desired.

FIGS. 6 and 7 show modified embodiments of the tool assembly of FIGS. 1–3. In FIG. 6 the tool head 50 is mounted in the end of a tool retainer 51 having a circular cross-section and the retainer is provided with groove 52 and threaded orifice 53 extending from the groove to the back of the slot 54. The slot in this embodiment is T-shaped for receiving the cooperating T-shaped slide member 55 of the tool head 50. The slide member is provided with a tapered recess 56 for alignment with a set screw, not shown, as the latter is threaded through the orifice 53 to lock the head to the retainer. Although the head is shown as fixed to the end surface of the tool retainer in FIG. 6, the orientation of the cutting element 56 with respect to the tool retainer 51 will be automatically effected during assembly of the head of the retainer in the same manner as with the construction of FIG. 5.

FIG. 7 shows a tool construction similar to that of FIG. 6. In the construction of FIG. 7, however, the tool retainer 60 is square in cross section for insertion into a suitable tool post and the connection between the head 61 and the retainer 60 is effected by a dovetailed slide and groove arrangement. Also the tool retainer 60 of the construction shown in FIG. 7 is not provided with a set screw hole but is instead provided with the tapered recess 62, and in this modification it is the head 61 that is provided with a threaded orifice 63 for receiving the tapered set screw 64.

In FIGS. 8 and 9, an adjustable tool assembly is shown as comprising a tool head 70 having a cutting element 71 fixed thereto at one end and adapted to be received within the cut out portion 72 of a tool retainer 73. The back end of the tool head is rounded as shown at 74 and the slide member 75 is rotatably secured to the head 70 by means of the pin 76 and bolt 77. The pin 76 is provided on its upper surface with a tapered recess 77′ and at its lower end with a threaded bore 78 for receiving the bolt 77. Besides the recess 77′, a plurality of additional recesses 79, 80 are provided along the center axis 81—81 of the slide member 75 for cooperating with a tapered set screw adapted to be threaded through an orifice 82 in the tool retainer. In addition to this, a tapered hole 83 is provided in the tool retainer 73 for alignment with a tapered hole 84 in the tool head 70. When these holes 83, 84 are aligned they define a smooth single hole and as such are adapted to receive a tapered pin 85 which will align the tool head 70 within the retainer 73 with the longitudinal axis 81—81 of the slide perpendicular to the longitudinal axis 86—86 of the head. The tapered construction will inherently prevent the pin from dropping out of the bottom of the head.

As shown in FIG. 8, the surfaces 87 and 88 of the slide and head members, respectively, cooperate to define an index mechanism. On the surface 87 of the slide member are scribed suitable calibrations which are correlated directly with various angular positions at which the head 70 may be set relative to the longitudinal axis of the holder. These calibrations cooperate with an index line formed by the intersection of the surfaces 87 and 88 as the head member is rotated relative to the retainer. Once the tool head has in this manner been rotated to the desired position the bolt 77 is then tightened to lock the slide 75 to the head and the set screw is then threaded through the orifice 82 into the appropriate tapered recess to thereby lock the head to the retainer.

With each of the embodiments described above, it is to be understood that each of the tool heads that are constructed for mounting in a particular tool retainer may be constructed with the same reference dimensions so that they may be interchangeably mounted in the appropriate tool retainer with identical orientation of the cutting element. And it is to be further understood that various changes may be made to the embodiments described above without departing from the scope of the invention as set forth in the following claims.

I claim:
1. A cutting tool assembly comprising:
  (a) an elongated rod member;
  (b) a seating surface of predetermined contour at one end of said rod member;
  (c) a separate head member;
  (d) a seating surface having a contour complementary to the contour of the seating surface of said rod member;
  (e) a cutting element secured to said head member;
  (f) a groove extending through one of said members and opening on its seating surface;
  (g) a slide secured to the seating surface of the other of said members and having a shape complementary to said groove;
  (h) at least one conically tapered recess in either of said members;
  (i) an aligning orifice in the other of said members in approximate alignment with said recess when said slide is positioned within said groove; and
  (j) a set pin having a conically tapered point complementary to said recess extending through said aligning orifice and into said recess for locking said members together.

2. A cutting tool assembly according to claim 1 wherein:
   (a) said groove is formed in said rod member;
   (b) said aligning orifice is formed in said rod member; and
   (c) said seating surfaces are substantially flat.

3. A cutting tool assembly according to claim 2 wherein:
   (a) said groove extends along a straight axis perpendicular to the longitudinal axis of said rod member; and
   (b) a plurality of said recesses are formed on said slide along its longitudinal axis.

4. A cutting tool assembly according to claim 3 further including:
   (a) means for rotatably securing said slide to said head member; and
   (b) means for aligning said slide on said head member with the longitudinal axis of each extending at right angles to each other.

5. A cutting tool assembly comprising:
   (a) an elongated rod member;
   (b) a seating surface of predetermined contour defined by one end of said rod member;
   (c) a groove extending through said rod member and opening on said seating surface;
   (d) an aligning orifice extending through said rod member into the bottom of said groove;
   (e) a separate head member;
   (f) a seating surface defined by one surface of said head member and having a contour complementary to the contour of the seating surface of said rod member;
   (g) a slide fixed to the seating surface of said head member and having a shape complementary to said groove;
   (h) at least one tapered recess on said slide adapted to be positioned in approximate alignment with said aligning orifice upon sliding said slide into said groove;
   (i) a cutting element fixed to said tool head; and
   (j) a set screw having a tapered point complementary to said recess threaded through said aligning orifice and into said tapered recess for locking said head member to said rod member in a predetermined orientation.

6. A cutting tool assembly according to claim 5 wherein said groove and slide member are dovetailed in cross section.

7. A cutting tool assembly according to claim 5 wherein said groove extends along a straight axis perpendicular to the longitudinal axis of said rod member.

8. A cutting tool assembly according to claim 7 wherein said cutting element includes:
   (a) an edge extending in a direction parallel to said straight axis; and
   (b) a cutting point defined in part by said edge.

References Cited by the Examiner
UNITED STATES PATENTS

| | | | |
|---|---|---|---|
| 66,641 | 7/1867 | Shackleton | 29—96 |
| 862,809 | 8/1907 | Conklin | 29—96 |
| 2,063,128 | 12/1936 | Severson | 29—96 |

FOREIGN PATENTS

| | | |
|---|---|---|
| 1,084,955 | 8/1949 | France. |
| 1,013,940 | 8/1957 | Germany. |

WILLIAM W. DYER, Jr., *Primary Examiner.*

HARRISON L. HINSON, *Examiner.*